United States Patent
Phillips et al.

(10) Patent No.: US 12,004,256 B2
(45) Date of Patent: Jun. 4, 2024

(54) SYSTEMS AND METHODS FOR INFERRING INTENT TO OPT-OUT OF COMMUNICATIONS

(71) Applicant: Augusta AI LLC, Augusta, GA (US)

(72) Inventors: David Phillips, Grovetown, GA (US); Eric Kobbe, Milledgeville, GA (US); Joshua Bates, Grovetown, GA (US)

(73) Assignee: Augusta AI LLC, Augusta, GA (US)

( * ) Notice: Subject to any disclaimer, the term of this patent is extended or adjusted under 35 U.S.C. 154(b) by 0 days.

(21) Appl. No.: 18/075,359

(22) Filed: Dec. 5, 2022

(65) Prior Publication Data

US 2024/0032145 A1 Jan. 25, 2024

Related U.S. Application Data

(60) Provisional application No. 63/285,822, filed on Dec. 3, 2021.

(51) Int. Cl.
  *H04W 76/34* (2018.01)
  *H04W 72/0453* (2023.01)
  *H04W 76/20* (2018.01)

(52) U.S. Cl.
  CPC ....... *H04W 76/34* (2018.02); *H04W 72/0453* (2013.01); *H04W 76/20* (2018.02)

(58) Field of Classification Search
  CPC . H04W 76/34; H04W 72/0453; H04W 76/20; H04M 3/5191; H04M 3/5141; H04M 3/5175; H04M 7/0042; H04M 2203/2061; H04L 51/02; H04L 67/535; H04L 67/02; H04L 67/561; H04L 67/53; H04L 67/566; H04L 12/1827; H04L 12/1813; H04L 51/216; H04L 65/4038; H04L 67/75; H04L 67/00; G06Q 30/0214; G06Q 30/0239; G06Q 50/01; G06Q 30/0251; G06Q 30/0276; G06Q 30/0282; G06Q 10/00;
  (Continued)

(56) References Cited

U.S. PATENT DOCUMENTS

2016/0099892 A1* 4/2016 Palakovich ............. H04L 51/04
                                                                  709/206
2017/0004517 A1* 1/2017 Jaggi ................... G06Q 30/0203
(Continued)

OTHER PUBLICATIONS

ACM Reference. Title: Collaborative Intent Prediction with Real-Time Contextual Data. Sun et al. ACM Transactions on Information Systems, vol. 35, No. 4, Article 30, Publication date: Aug. 2017. (Year: 2017).*

(Continued)

*Primary Examiner* — Mohammed S Chowdhury
(74) *Attorney, Agent, or Firm* — Sheppard, Mullin, Richter & Hampton LLP

(57) ABSTRACT

A processing server assists in selectively removing or opting-out a client device from further communications. The processing server includes a hardware processor, and memory storing computer instructions that when executed perform transmitting a message to an entity, indicating directions to opt-out of receiving further communications, receiving, in response to the transmitting of the message, a reply, from the entity, inferring an intent of the reply pertaining to opting-out of receiving communications, and selectively terminating the communications based on the inferred intent.

16 Claims, 13 Drawing Sheets

(58) Field of Classification Search
CPC .............. G06Q 10/06; H04N 21/4662; H04N 21/44016; H04N 21/81; H04N 21/252; H04N 21/25841; H04N 21/25883; H04N 21/25891; H04N 21/4756; H04N 21/658; H04N 21/814; H04N 21/812; G06F 16/00; G06F 40/40; G06F 16/9535

See application file for complete search history.

(56) References Cited

U.S. PATENT DOCUMENTS

| | | | |
|---|---|---|---|
| 2017/0026318 A1* | 1/2017 | Daniel | H04L 51/046 |
| 2017/0318024 A1* | 11/2017 | Ebersman | H04L 51/10 |
| 2018/0115643 A1* | 4/2018 | Skiba | H04M 3/5175 |
| 2019/0007228 A1* | 1/2019 | Vuskovic | G06F 16/00 |
| 2022/0377424 A1* | 11/2022 | Deng | G06Q 30/0282 |

OTHER PUBLICATIONS

IEEE: Sentiment Prediction in Social Networks; Shengmin Jin & Reza Zafarani; Data Lab, EECS Department, Syracuse University. 2018 IEEE International Conference on Data Mining Workshops (ICDMW). (Year: 2018).*

Survey of visual sentiment prediction for social media analysis; Rongrong, Donglin Cao, Yiyi Zhou, Fuhai Chen; Cognitive Science Department, Xiamen University, Xiamen 361005, China / Fujian Key Laboratory of the Brain-like Intelligent Systems, Xiamen 361005, China. Front. Comput. Sci., 2016 (Year: 2016).*

* cited by examiner

SYSTEMS AND METHODS FOR INFERRING INTENT TO OPT-OUT OF COMMUNICATIONS

PRIORITY CLAIM

This application claims benefit of U.S. provisional application Ser. No. 63/285,822, entitled "Stop/Opt-Out Machine Learning AI," filed on Dec. 3, 2021, by inventors David Phillips et al., which is hereby incorporated by reference.

TECHNICAL FIELD

This invention relates generally to computer systems, and more particularly provides systems and methods for inferring an intent to opt-out from communications, such as text and/or media notifications.

BACKGROUND

Media consumption and advertising has experienced a renaissance in recent years, and has become ubiquitous across devices, such as on smart devices and other computing devices. However, United States federal and state laws and/or regulations, such as from the Federal Trade Communication (FTC) and the Telephone Consumer Protection Act (TCPA) are intended to prevent entities who wish to be opted-out from such communications from receiving these communications. These laws stipulate that any sender sending text and/or mobile communications must not only acquire prior express written consent from any recipient but also provide an option to opt out via reasonable means. Any recipient who has expressed a desire to opt out is to be opted-out. Additionally, any recipient who has been opted-out may be opted-in only if that recipient expresses a clear intent to be opted-in.

SUMMARY

Accurately inferring an intent of whether an entity desires to be opted-out, removed, or excluded (hereinafter "opted-out") from textual and/or media communications on their devices would ensure conformance with laws, without depriving interested entities from receiving such communications. The inferred intent may not be straightforward in some situations, but inferring the intent in such situations is especially instrumental in these situations. For example, some replies fail to comply with a keyword or phrase, but still may express a desire to be opted out. As another example, an entity may receive a message that has been transmitted erroneously. Erroneously receiving a message may occur due to a change of phone numbers of a previous entity who received such messages. The old phone number may have been reassigned to a new entity who is not supposed to receive such messages. As another example, even if a reply includes threats, such as of violence, and/or profanity, that reply may not always indicate an intent to opt-out. Lastly, any entity that indicates a current bankruptcy status, or that the entity is currently engaged or associated with bankruptcy proceedings, are to be opted-out of certain communications such as collections attempts.

In some embodiments, the present invention provides a processing server configured to assess any situations in which a message or reply by an entity or a client device (hereinafter "entity") indicates an intent to opt out of receiving communications. The processing server may include: one or more hardware processors; and memory storing computer instructions, the computer instructions when executed by the one or more hardware processors configured to perform: transmitting a message, for example, to an entity or user (hereinafter "entity"), indicating directions to opt-out of receiving communications; receiving, in response to the transmitting of the message, a reply, for example, from the entity; inferring an intent of the reply pertaining to opting-out of receiving communications, such as textual communications and/or media communications, and selectively terminating the communications based on the inferred intent. In particular, the selectively terminating of the communications may include, in response to inferring that the entity intends to be opted-out of the communications, terminating the communications, and in response to inferring that the entity intends to continue receiving communications, continuing the communications.

In some embodiments, the inferring of the intent may be based on a sentiment and/or a context associated with a reply.

In some embodiments, the sentiment may be based on an existence or an absence of profanity within the reply.

In some embodiments, the context may be associated with a historical behavior of the entity.

In some embodiments, the historical behavior may be based on a frequency of opting-in following the opting-out.

In some embodiments, the context may be associated with the message.

In some embodiments, the inferring of the intent is performed by a trained machine learning component or model (hereinafter "component").

In some embodiments, the computer instructions, when executed by the one or more hardware processors, are configured to perform generating a score indicating a confidence level of the inferred intent.

In some embodiments, the inferring of the intent is based on an inference of any textual components within the reply and any media components within the reply. If either the textual or the media components are inferred to indicate an intent to opt-out, then the inferring of the intent comprises inferring that the entity intends to be opted-out of the communications. In some examples, textual components may include text messages, electronic mail messages, instant messaging application messages, in-application messages, and/or short message service (SMS) messages.

In some embodiments, the inferring of the intent comprises inferring whether the reply indicates an intent to adjust a frequency of the communications, and selectively adjusting the frequency of the communications based on the intent to adjust the frequency of the communications.

DETAILED DESCRIPTION

The following description is provided to enable a person skilled in the art to make and use various embodiments of the invention. Modifications are possible. The generic principles defined herein may be applied to the disclosed and other embodiments without departing from the spirit and scope of the invention. Thus, the claims are not intended to be limited to the embodiments disclosed, but are to be accorded the widest scope consistent with the principles, features and teachings herein.

Within a network, a transmitting server, processor, or computer may transmit a message to a client device. This message may encompass, for example, textual and/or media components, such as a picture, video, and/or audio. This message may be, and/or be directed to a purpose of, a reminder, a status report, an update, an advertisement, and/or information regarding a product or a service, such as from a vendor. Following the transmission of the message, the transmitting server or a different server may receive a reply or response message from the client device and infer an intent of this reply or response message. Accurately inferring an intent of a reply or response message is crucial for the protection of multiple entities. In particular, any entities (e.g., client devices or users associated with client devices) who intend to receive such communications would still receive value from such communications. Meanwhile, any entities who intend or desire to be opted-out would stop receiving such communications, and a sender (e.g., an entity associated with the transmitting server that transmits the message to the client device) of such communications may avoid a lawsuit or other penalty for improperly transmitting communications to entities that should have been opted out. Following an opt-out, the transmitting server or a different server, may transmit a confirmation message, prompting the client device to input a specific phrase if the client device wishes to opt back in. If the client device enters a specific phrase that satisfies certain criteria, then the client device may be opted back in to continue receiving messages. Infrastructure and mechanisms for accurately inferring the intent of the reply, implementing an action in accordance with the inferred intent, and training a machine learning component to accurately infer the intent, are illustrated in the figures herein.

Figure 1A:
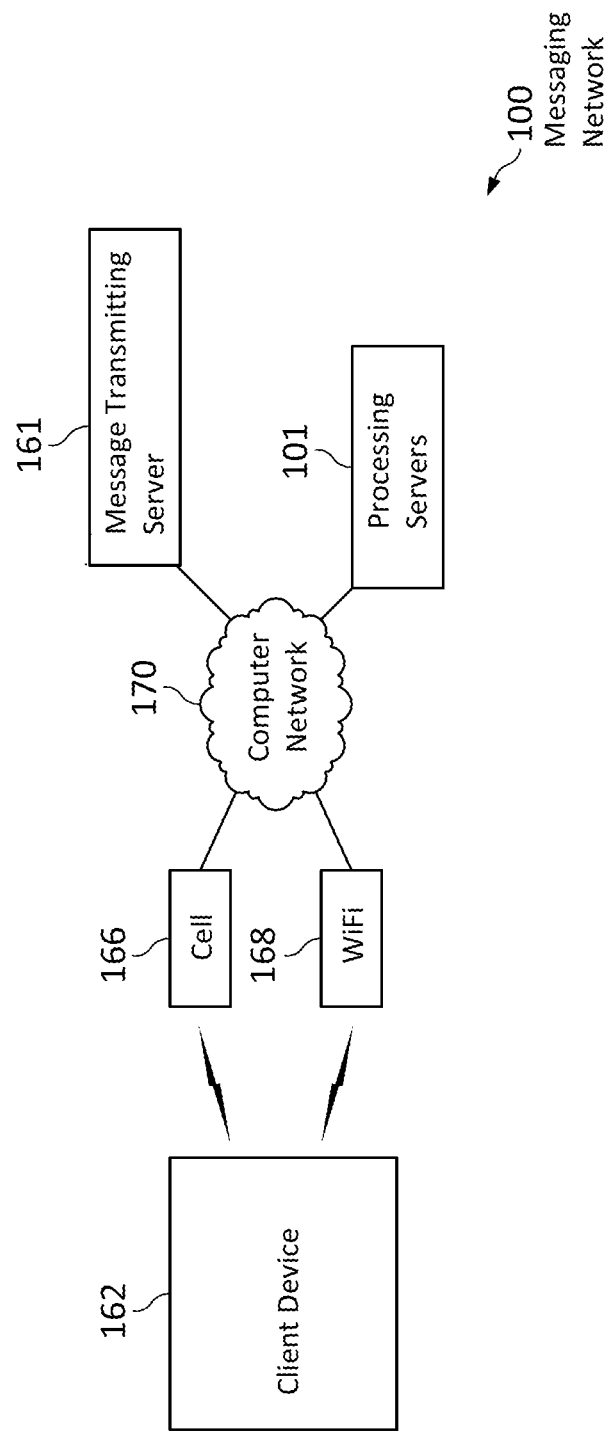
FIG. 1A is a block diagram of a messaging network, in accordance with some embodiments of the present invention.

FIG. 1A is a block diagram of a messaging network 100, in accordance with some embodiments of the present invention, in which messages may be transmitted from a message transmitting server 161 to a client device 162. Processing servers 101 may analyze the messages from the message transmitting server 161 and/or replies by the client device 162. Additionally or alternatively, the processing servers 101 may make inferences regarding the messages from the message transmitting server 161 and/or replies by the client device 162 by the processing servers 101.

The client device 162 may be coupled via a cellular channel 166 and/or a WiFi channel 168 to a computer network 170, which is connected to the processing servers 101. The WiFi channel 168 may encompass technologies such as home WiFi, public WiFi, WiFi (Wireless Fidelity), BLE (Bluetooth Low Energy), and IEEE (Institute of Electrical and Electronics Engineers) 802.15.4 protocols such as Zigbee (Zonal Intercommunication Global-standard, where Battery life is long, which is Economical to deploy, and which exhibits Efficient use of resources), ISA100.11a (Internet Society of Automation 100.11a), WirelessHART (Highway Addressable Remote Transducer Protocol), MiWi (Microchip Wireless), 6LoWPAN (IPv6 over Low-Power Wireless Personal Area Networks), Thread, and SNAP (Subnetwork Access Protocol), and/or the like). The client device 162 may be any smart device such as laptop, mobile phone, tablet, desktop computer, car entertainment/radio system, game console, smart television, set-top box, smart appliance or general edge-computing device. The computer network 110 may include any wide area network, local area network, wireless area network, private network, public network and/or the particular wide area network commonly referred to as the Internet. The one or more processing servers 101 may be one or more computer device capable of processing the information captured by the client device 102 (and other similar client devices of other users).

Figure 1B:
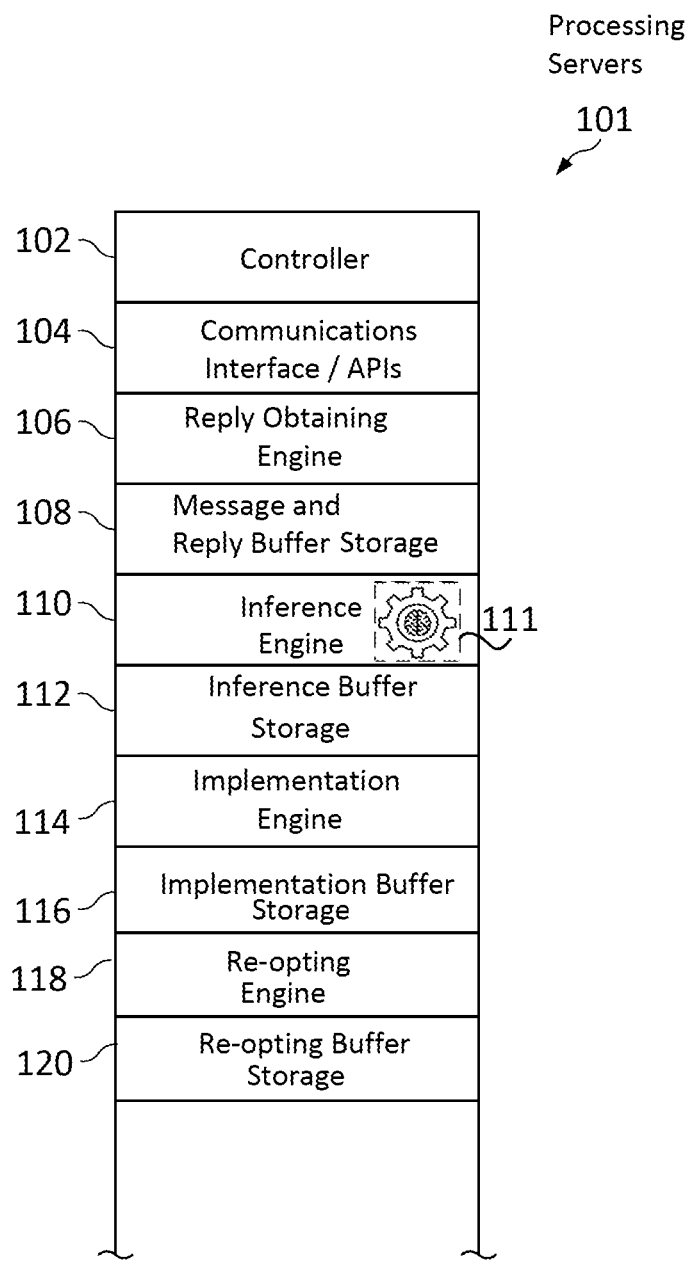
FIG. 1B is a block diagram of a processing server that selectively removes or opts-out client devices from further communications, in accordance with some embodiments of the present invention.

FIG. 1B is a block diagram of the one or more processing servers 101, in accordance with some embodiments of the present invention. The processing servers 101 may include a controller 102, a communications interface and application programming interfaces (APIs) 104, a reply obtaining engine 106, a message and reply buffer storage 108, an inference engine 110, which may encompass or otherwise access one or more machine learning components 111, an inference buffer storage 112, an implementation engine 114, and/or implementation buffer storage 116.

The controller 102 includes hardware, software and/or firmware configured to control the process of the processing servers 101. The controller 102 is configured to manage general operations as well as monitor and manage the other services, such as inference services, implementation services, machine learning component training services, data management or storage services and notification services. The controller 102 is configured to manage configuration and state information, as well as establish channels to the components within itself, to running the other services, and to interactions with one or more entities, such as an end user. For example, the controller 102 may use the communications interface and APIs 104 to identify when storage is running low, to shut down any services that are occupying storage, or any services occupying highest amounts or rates of storage, to provide a notification, for example, to a user, when storage is getting low (e.g., below a threshold storage level) and when some of the captured data should be offloaded, to identify when battery of, or associated with, the processing servers 101 and/or the controller 102 is running low, to shut down any services that might be draining the battery, to provide a notification, for example, to a user, that due to low battery data capture services have been temporarily stopped until recharged, to identify a health and/or stability of the processing servers 101 and/or the controller 102 and data capture services, to detect a state or status of the processing servers 101 and/or the controller 102, available resources, permissions available and/or the like, to control restarting of the processing servers 101 and/or the controller 102 and/or other services, to prompt the user when permissions have changed or need to be refreshed, and/or to support certain optimizations as discussed below.

Figure 2A:
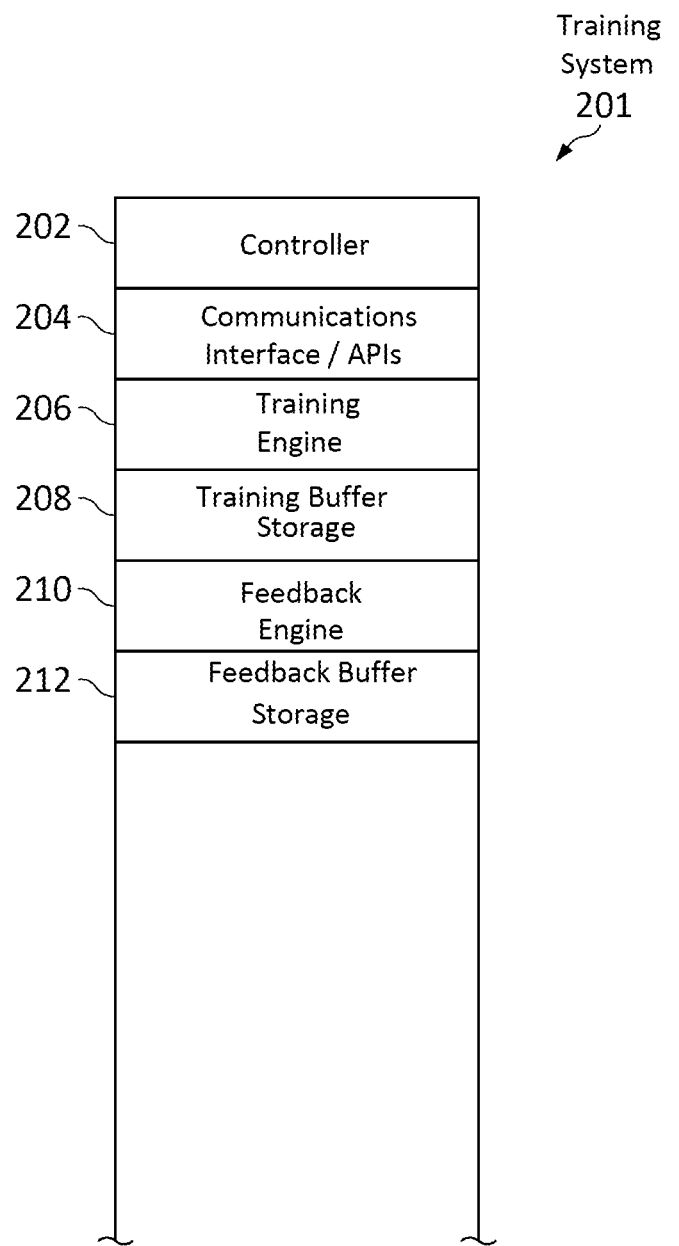
FIG. 2A is a block diagram of a training system configured to provide training to the machine learning components, in accordance with some embodiments of the present invention.
Figure 2B:
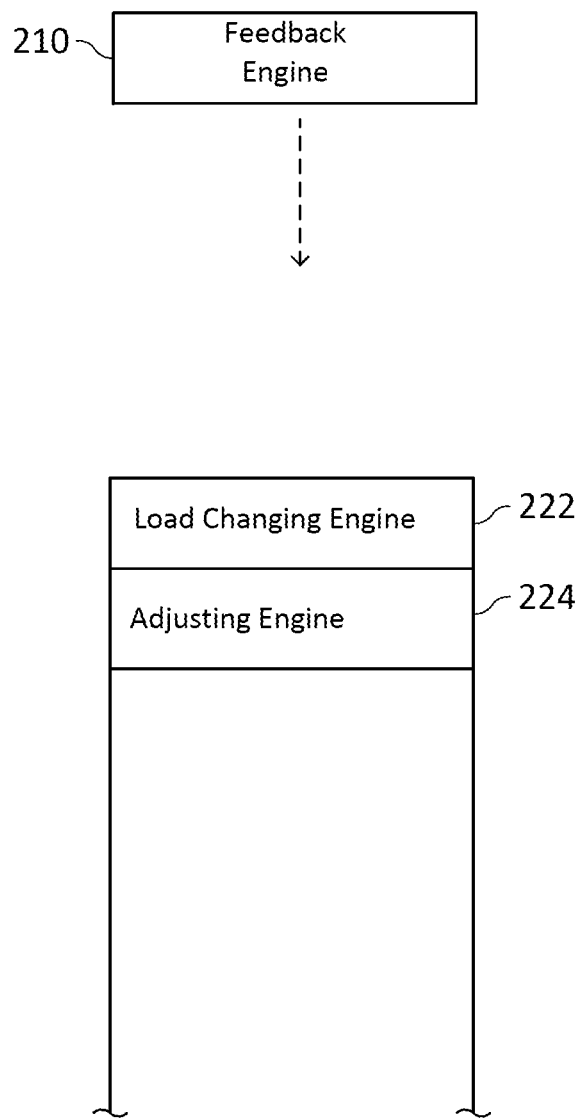
FIG. 2B is a block diagram of a feedback engine configured to provide retraining, or subsequent training, to the machine learning components, in accordance with some embodiments of the present invention.

The communications interface and APIs 104 include hardware, software and/or firmware configured to enable the processing servers 101 (e.g., the controller 102, the communications interface and application programming interfaces (APIs) 104, the reply obtaining engine 106, the message and reply buffer storage 108, the inference engine 110, the one or more machine learning components 111, the inference buffer storage 112, the implementation engine 114, and/or the implementation buffer storage 116) to communicate with other components, such as the client device 162 that receives a message, the message transmitting server 161 that transmits the message, as illustrated in FIG. 1A, and/or communications interface and APIs 204 in FIGS. 2A and 2B to obtain information regarding training of the machine learning components 111, and/or other components of the training system 201.

The reply obtaining engine 106 may include hardware, software and/or firmware configured to use the communications interface and APIs 104 to capture one or more messages transmitted to (e.g., by the message transmitting server 161) and/or received from the client device 162. For example, the one or more messages may be in a textual format and/or media, such as audio, video, and/or images.

The message and reply buffer storage 108 may include hardware, software and/or firmware configured to store information regarding the one or more messages (e.g., transmitted by the message transmitting server 161) and/or the one or more replies (e.g., transmitted by the client device 162), such as, contents of the messages and/or replies, and/or metadata of the messages and/or replies, such as dates and times of the messages and/or replies, and/or information regarding frames or packets in which the messages and/or replies were transmitted. The message and reply buffer storage 108 may store sequential messages and/or replies into respective buffer slots in the message and reply buffer storage 108. For example, the message and reply buffer storage 108 may store the sequential messages and/or replies in the respective buffer slots in a temporal order (e.g., according to times of the messages and/or replies). In some examples, the messages may be stored separately from the replies.

The inference engine 110 may include hardware, software and/or firmware configured to utilize, deploy, or leverage the one or more machine learning components 111 to infer an entity's intent regarding whether or not the entity desires to be opted out of receiving messages. The entity may be associated with the client device 162. For example, the entity may be a user of the client device 162. The machine learning components 111 may include any of decision trees, tree nodes, a Gradient Boosting Machine (GBM), or a light GBM model. The inference engine 110 may include different layers or filters of analysis, in which each layer or filter may be customized. The inference engine 110 may evaluate, either in parallel or sequentially, against the different layers or filters. For example, one layer or filter may involve inferring that any message that includes certain keywords (e.g., "stop"), phrases, or categories or classifications of words or phrases (e.g., profanity), and/or variations thereof, may be inferred as an intent to opt-out. However, in contrast, in other examples, even when profanity is present in a response message from the client device 162, the profanity does not automatically indicate an intent to opt-out, but rather, is interpreted together with other contextual and sentiment attributes of the response message. The inference engine 110 may, in addition to outputting a binary indication of whether or not the entity desires to be opted out of receiving messages, also further output a confidence score or indication of certainty regarding the inferred intent. For example, the inferred intent may be scored on a scale of between negative 50 and 50, in which a score of negative 50 indicates a strongest, or most certain, intent to opt-out, whereas a score of 50 indicates a strongest, or most certain, intent to continue receiving messaging, and a score a zero indicates an uncertain or ambivalent intent, in which a probability of an intent to opt-out is equally as likely as an intent to continue receiving messaging. In some examples, certain scores near zero, such as between negative 5 and 5, may indicate an intent to receive fewer messages or messages at lower frequencies than a current or default frequency. Details of the inference engine 110 are elucidated further in FIGS. 1C and 1D.

The inference buffer storage 112 may include hardware, software and/or firmware configured to store information regarding the inferences, such as, inferences associated with the client device 162, which may also include inferences and/or confidence scores at different times, as well as an indication of whether or not, and how often, the client device 162 indicates to opt back in following an opt-out. The inference buffer storage 112 may store sequential inferences, and/or other associated information, into respective buffer slots in the inference buffer storage 112. For example, the inference buffer storage 112 may store the sequential inferences in the respective buffer slots in a temporal order (e.g., according to times of the inferences).

The implementation engine 114 may include hardware, software and/or firmware configured to, based on any outputs from the inference engine and/or information stored in the inference buffer storage, selectively implement an action to opt-out or discontinue the client device 162 from further communications or messaging, to change a frequency of the messaging, and/or to continue to transmit messages to the client device 162. The change of the frequency of the messaging may be at certain discrete or specified frequencies, such as once a week, biweekly, or once a month. Details of the implementation engine 114 are further described in FIG. 1D.

The implementation buffer storage 116 may include hardware, software and/or firmware configured to store information regarding the implementation, such as, implementations associated with the client device 162, and/or metadata of the implementations, such as, dates and times at which the client device 162 was opted-out, and/or, at which a frequency of messaging changed. The implementation buffer storage 116 may store sequential implementations into respective buffer slots in the implementation buffer storage 116. For example, the implementation buffer storage 116 may store the sequential implementations in the respective buffer slots in a temporal order (e.g., according to times of the messages).

The re-opting engine 118 may include hardware, software and/or firmware configured to determine, following an opting-out of messaging, whether the client device 162 is to be opted back in to resume transmission of messages. For example, the re-opting engine 118, or a different server or processor, transmits a confirmation message that prompts the client device 162 to input a specific phrase if the client device 162 wishes to opt back in. If the re-opting engine 118 receives an indication of a specific phrase or word that satisfies certain criteria, such as "continue" or "resume," then the re-opting engine 118 may opt the client device 162 back in to resume transmission of messages.

The re-opting buffer storage 120 may include hardware, software and/or firmware configured to store information regarding the re-opting, such as, instances at which opting back in of the client device 162 occurred, and/or metadata of the implementations, such as, dates and times at which the client device 162 was opted back in, a duration of time between opt-out and opting back in of the client device 162, and/or a proportion of time which the client device 162 was opted out compared to a time which the client device 162 has been opted back in. In some examples, the information regarding the re-opting may be used as feedback to train the machine learning components 111. In particular, an action of re-opting of the client device 162, and/or a short duration of time between opt-out and opting back in of the client device 162, may indicate that a seemingly negative sentiment in a reply was actually a positive sentiment indicative of a desire to continue receiving messages.

Figure 1C:
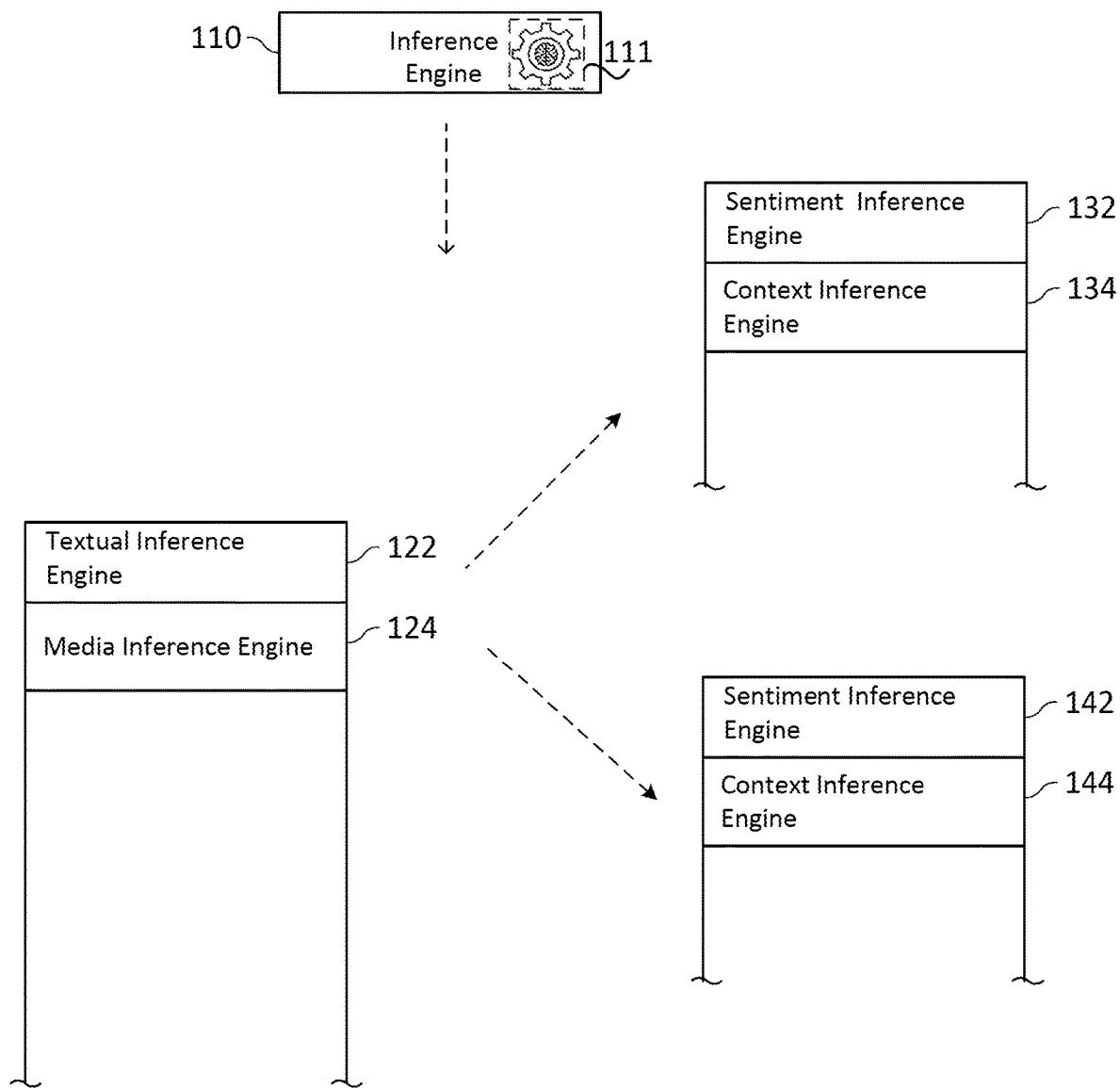
FIG. 1C is a block diagram of an inference engine configured to infer whether or not an entity intends to be opted-out, in accordance with some embodiments of the present invention.

FIG. 1C illustrates an example implementation of the inference engine 110. The inference engine 110 may encompass a textual inference engine 122 and a media inference engine 124, which may each include hardware, software and/or firmware configured to infer an intent from a textual and a media reply, respectively. In other words, intent from textual components (e.g., Short Message/Messaging Service (SMS)) and media (e.g., Multimedia Messaging Service (MMS), audio, video, and/or images) are analyzed separately to determine whether or not the client device 162 wishes to be opted-out. The images may have, as nonlimiting examples, a Joint Photographic Experts Group (JPEG), Portable Network Graphics (PNG), or a Graphics Interchange Format (GIF). In some examples, the textual components are analyzed first prior to the media. Media may be analyzed to determine whether or not a media stream from the client device 162 corresponds to, or matches, a template media stream, and/or a degree to which the media stream from the client device 162 matches the template media stream. The template media stream may indicate, for example, an intent to opt-out, or an intent to continue receiving messages. Thus, an inference of an intent from a media stream and a confidence level thereof may be based on a degree of matching between the media stream and a template media stream. If either of the textual or media components, or both the textual and the media components, indicate that the client device 162 wishes to be opted-out, then the inference engine 110 may infer an intent that the client device 162 wishes to be opted-out.

The inference of intent may be based on sentiment (e.g., an inferred emotion or desire of the reply message sent by the client device 162) and context (e.g., a message that was transmitted by the message transmitting server 161, and/or specific historical behaviors and/or attributes of the client device 162). As a particular example, a reply message sent by the client device 162 may contain profanity and/or be suggestive of negative emotion such as anger, which, by itself, may suggest an intent to opt-out. However, the context may actually provide a reasonable possibility that the client device 162 wishes to continue receiving messages. For example, relevant context may include that the message transmitted by the message transmitting server 161 was a reminder of a due date or some unpleasant occurrence. Thus, the sentiment evoked or suggested by the reply message sent by the client device 162 may be due to the contents of the message itself and not the receiving of a message. In some examples, if the sentiment suggested by the reply has some likelihood of being attributed or due to the contents of the message rather than the fact that the message was being transmitted, then the inference engine 110 may infer that the client device 162 wishes to remain opted-in, or, to continue receiving messages.

As another particular example, even if a reply message contains profanity, the sentiment may not be a negative emotion, in some contexts. For example, if the message transmitted by the message transmitting server 161 includes a positive message, such as an approval or a successful result, the profanity in the reply message may be construed as a positive sentiment in response to the message transmitted by the message transmitting server 161, thereby suggesting an intent to continue receiving messages rather than opting-out. Thus, the textual inference engine 122 may further include a sentiment inference engine 132 and a context inference engine 134, which may each include hardware, software and/or firmware configured to infer an intent, from textual components such as SMS, based on sentiment and context, respectively. Likewise, the media inference engine 124 may further include a sentiment inference engine 142 and a context inference engine 144, which may each include hardware, software and/or firmware configured to infer an intent, from media such as MIMS, based on sentiment and context, respectively.

As another particular example, if a reply message is ambivalent regarding intent, then historical behavior and/or attributes of the client device 162, and/or an entity or user associated with the client device 162, may inform the intent. For example, if the client device 162 has a high frequency (e.g., greater than a threshold duration) of re-opting back in following an opt-out, and/or tends to re-opt back in within a short duration (e.g., shorter than a threshold duration), then an ambivalent reply message (e.g., a score between negative 5 and 5) from the client device 162 may be more likely to be interpreted as intending to continue receiving messages. However, if the client device 162 has a low frequency (e.g., lower than a threshold duration) of re-opting back in following an opt-out, and/or tends to re-opt back in within a longer duration (e.g., longer than a threshold duration), then an ambivalent reply message (e.g., a score between negative 5 and 5) from the client device 162 may be more likely to be interpreted as intending to opt-out.

In some examples, particular communication and/or speech patterns of, or from, the client device 162, may also inform an inference of whether the client device 162 wishes to continue receiving messages or to opt-out. Specifically, if historically, messages from the client device 162 have a negative, harsh, or impolite tone, then an ambivalent reply message (e.g., a score between negative 5 and 5) from the client device 162 may be more likely to be interpreted as intending to continue receiving messages. On the other hand, if historically, messages from the client device 162 have a positive tone, then an ambivalent reply message (e.g., a score between negative 5 and 5) from the client device 162 may be more likely to be interpreted as intending to opt-out.

Figure 1D:
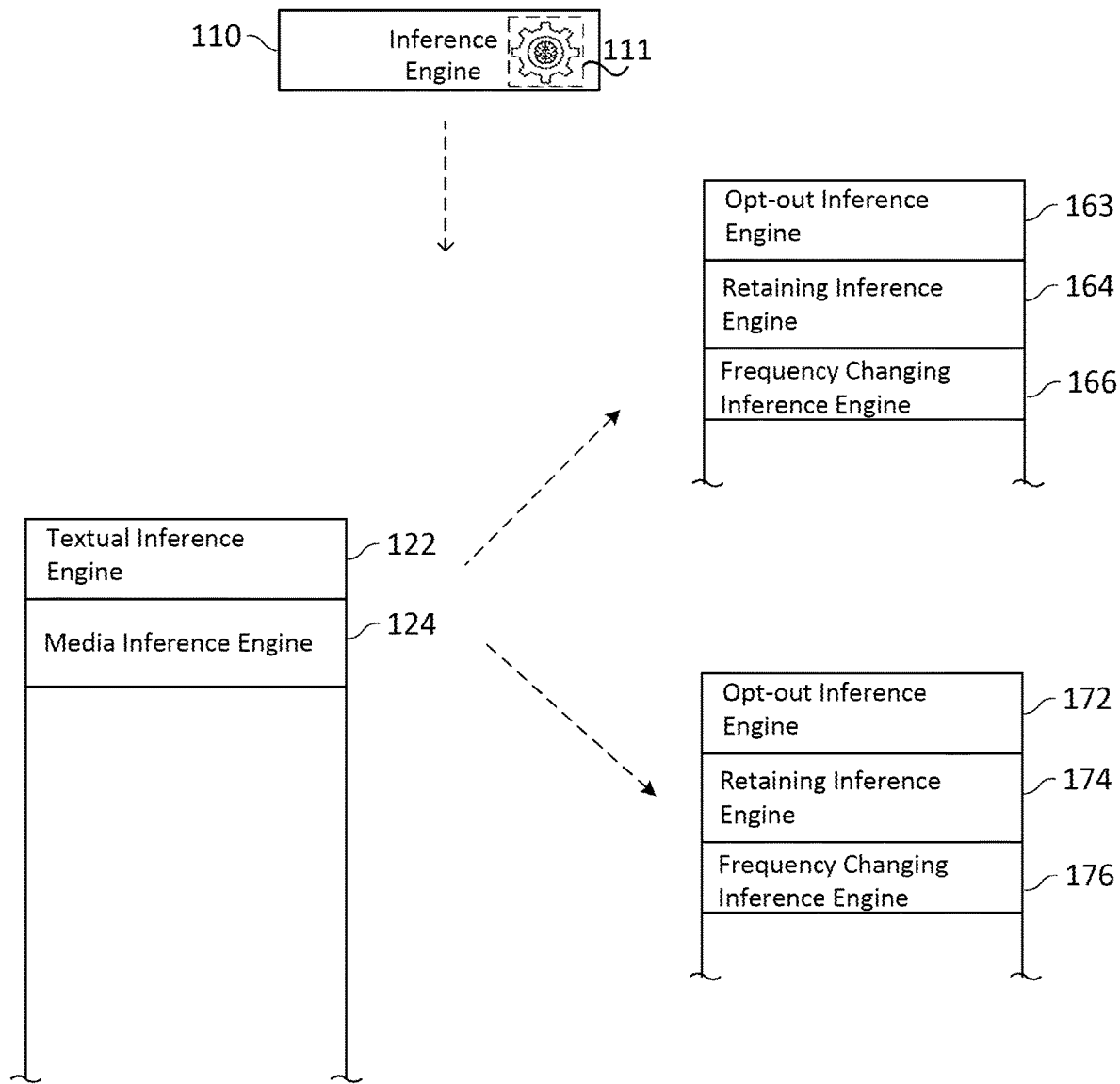
FIG. 1D is a block diagram of an inference engine configured to infer whether or not an entity intends to be opted-out, in accordance with some embodiments of the present invention.

FIG. 1D illustrates an example implementation of the inference engine 110, which may further encompass the textual inference engine 122 and the media inference engine 124. The textual inference engine 122 may include an opt-out inference engine 163, a retaining inference engine 164, and a frequency changing inference engine 166. The opt-out inference engine 163 may include hardware, software and/or firmware configured to infer that the client device 162 desires to opt-out. Such an inference may be based on a context and/or a sentiment of a reply from the client device 162, as described with respect to FIG. 1C. Additionally, the opt-out inference engine 163 may determine one or more respective degrees of proximity between the context and/or the sentiment of the reply from the client device 162 and those in first trained examples, within the machine learning components 111, which indicate that the client device 162 is intending to opt-out. If the degrees of proximity satisfy a threshold degree, then the opt-out inference engine 163 may determine that the client device 162 intends to opt-out. Additionally or alternatively, the opt-out inference engine 163 may determine one or more respective degrees of divergence between the context and/or the sentiment of the reply from the client device 162 and those in second trained examples, within the machine learning components 111, which indicate that the client device 162 is intending to continue receiving messages. If the degrees of divergence satisfy a threshold degree, then the opt-out inference engine 163 may determine that the client device 162 intends to opt-out from messaging.

The retaining inference engine 164 may include hardware, software and/or firmware configured to infer that the client device 162 intends to continue receiving messages. Such an inference may be based on a context and/or a sentiment of a reply from the client device 162, as described with respect to FIG. 1C. Additionally, the retaining inference engine 164 may determine one or more respective degrees of proximity between the context and/or the sentiment of the reply from the client device 162 and those in the second trained examples, within the machine learning components 111, which indicate that the client device 162 is intending to continue receiving messages. If the degrees of proximity satisfy a threshold degree, then the opt-out inference engine 163 may determine that the client device 162 intends to continue receiving messages. Additionally or alternatively, the retaining inference engine 164 may determine one or more respective degrees of divergence between the context and/or the sentiment of the reply from the client device 162 and those in the first trained examples, within the machine learning components 111, which indicate that the client device 162 is intending to opt-out. If the degrees of divergence satisfy a threshold degree, then the retaining inference engine 164 may determine that the client device 162 intends to continue receiving messages.

The frequency changing inference engine 166 may include hardware, software and/or firmware configured to infer that the client device 162 intends to continue receiving messages but at a different frequency. In some examples, the frequency changing inference engine 166 may receive an indication, in a reply from the client device 162, of "more messages" or "fewer messages," or a similar indication, and accordingly adjust a frequency of the messages. In some examples, the frequency changing inference engine 166 may determine that the intent from the context and/or the sentiment associated with a reply from the client device 162 is ambivalent (e.g., a confidence score of between negative 5 and 5) and according decrease a frequency of transmitting messages from a highest frequency of transmitting messages. In some examples, frequencies of transmitting messages may be discrete frequencies, and/or at discrete intervals (e.g., once a week, biweekly, or once a month). Additionally, the frequency changing inference engine 166 may determine one or more respective degrees of proximity between the context and/or the sentiment of the reply from the client device 162 and those in the second trained examples, within the machine learning components 111, which indicate that the client device 162 is intending to continue receiving messages. If the degrees of proximity are within a range (e.g., some intermediate range indicating a high degree of uncertainty), then the frequency changing inference engine 166 may determine that the client device 162 may want to reduce a frequency of receiving messages. Additionally or alternatively, the frequency changing inference engine 166 may determine one or more respective degrees of divergence between the context and/or the sentiment of the reply from the client device 162 and those in the first trained examples, within the machine learning components 111, which indicate that the client device 162 is intending to opt-out. If the degrees of divergence are within a range (e.g., an intermediate range), then the frequency changing inference engine 166 may determine that the client device 162 may want to reduce a frequency of receiving messages.

Figure 1E:
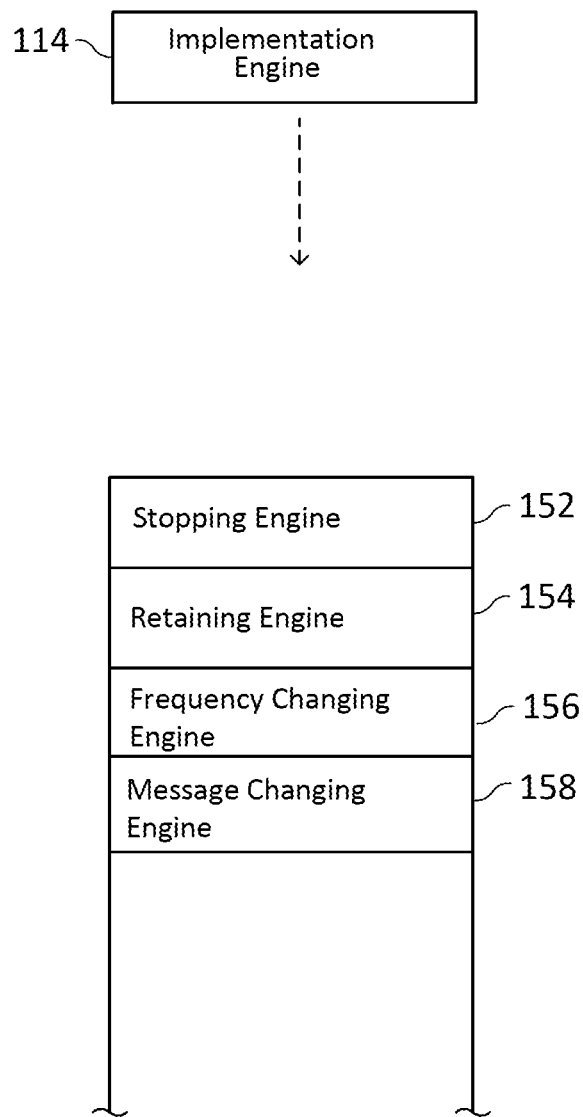
FIG. 1E is a block diagram of an implementation engine configured to selectively implement the opting-out of a client device, in accordance with some embodiments of the present invention.

FIG. 1E illustrates an example implementation of the implementation engine 114, which may further encompass a stopping engine 152, a retaining engine 154, a frequency changing engine 156, and a message changing engine 158. The stopping engine 152 may include hardware, software and/or firmware configured to terminate messages to the client device 162, following an inference by the inference engine 110 (in particular, the opt-out inference engine 163) that the client device 162 wishes to opt-out and terminate messaging. The retaining engine 154 may include hardware, software and/or firmware configured to continue transmitting messages to the client device 162, or, to refrain from interrupting the transmission of messages to the client device 162, following an inference by the inference engine 110 (in particular, the retaining inference engine 164) that the client device 162 wishes to continue receiving messages. The frequency changing engine 156 may include hardware, software and/or firmware configured to change a frequency of messages to the client device 162, following an inference by the frequency changing inference engine 166 to change a frequency of the messaging. The message changing engine 158 may include hardware, software and/or firmware configured to change a content, tone, sentiment, and/or delivery of the messaging, and/or to suggest such a change, based on a rate of opting-out of one or more particular client devices, and/or an overall rate of opting-out of client devices. An objective of the message changing engine 158 may be to decrease a rate of opting-out for particular client devices, and/or for client devices in general. For example, if replies by a particular client device tend to have a more polite tone, then the message changing engine 158 may tailor messages to match a tone and/or a sentiment of replies of that particular client, by creating different messages that are more polite and deferential. In particular, one particular client device may tend to utilize diction such as "please," or "kindly," so the message changing engine 158 may tailor messages send to that particular client device to also have same or similar diction. In some examples, the message changing engine 158 may, in stages or iterations, change a content, tone, sentiment, and/or delivery of the messaging and determine whether such change has an effect on the rate of opting-out for all client devices subscribed to a messaging or other service, or a group of client devices. If any change decreases the rate of opting-out for all such client devices, or for a group of client devices, then the message changing engine 158 may implement such a change.

FIG. 2A illustrates a block diagram of the training system 201, used to iteratively train the machine learning components 111 to infer intents of one or more replies by the client device 162. The training system 201 includes a controller 202, a communications interface and application programming interfaces (APIs) 204, a training engine 206, a training buffer storage 208, a feedback engine 210, a feedback buffer storage 212, a retraining engine 214, and/or retraining buffer storage 216.

The controller 202 includes hardware, software and/or firmware configured to control the process of the training system 201. The controller 202 is configured to manage general operations as well as monitor and manage other services, such as inference services, implementation services, data management or storage services and notification services. The controller 202 is configured to manage configuration and state information, as well as establish channels to the components within itself, to running the other services, and to interactions with one or more entities, such as an end user. For example, the controller 202 may use the communications interface and APIs 204 to identify when storage is running low, to shut down any services that are occupying storage, or any services occupying highest amounts or rates of storage, to provide a notification, for example, to a user, when storage is getting low (e.g., below a threshold storage level) and when some of the captured data should be offloaded, to identify when battery of, or associated with, the training system 201 and/or the controller 202 is running low, to shut down any services that might be draining the battery, to provide a notification, for example, to a user, that due to low battery data capture services have been temporarily stopped until recharged, to identify a health and/or stability of the training system 201 and/or the controller 202 and data capture services, to detect a state or status of the training system 201 and/or the controller 202, available resources, permissions available and/or the like, to control restarting of the training system 201 and/or the controller 202 and/or other services, to prompt the user when permissions have changed or need to be refreshed, and/or to support certain optimizations as discussed below.

The communications interface and APIs 204 include hardware, software and/or firmware configured to enable the training system 201 (e.g., the controller 202, the communications interface and application programming interfaces (APIs) 204, the training engine 206, the training buffer storage 208, the feedback engine 210, and/or the feedback buffer storage 212) to communicate with other components, such as the client device 162 that receives a message, the message transmitting server 161 that transmits the message, as illustrated in FIG. 1A, and/or communications interface and APIs 104 in FIG. 1B to transmit information regarding training of the machine learning components 111, and/or other components of the processing servers 101.

The training engine 206 may include hardware, software and/or firmware configured to use the communications interface and APIs 204 to iteratively train the machine learning components 111 using training data or datasets. The training data may include a first set of training data that includes examples or scenarios in which an intent of a reply by a client device is to opt-out, based on sentiment and/or context, and a second set of training data that includes examples or scenarios in which an intent of a reply by a client device is to continue receiving messages, based on sentiment and/or context. In some examples, the training data includes actual replies received from different client devices, rather than manually generated examples. The training dataset, prior to training, and/or during running of the machine learning components 111, may be in a compressed format, but during training and/or retraining, may be decompressed or uncompressed. In some examples, following a first, or initial, stage of training, the training system 201 performs a second stage of training ("retraining") using scenarios or examples that were erroneous and/or less accurate compared to other scenarios or examples (e.g., scenarios or examples that failed to satisfy some threshold level or standard of accuracy) during the first stage of training. Thus, the training data of the second stage of training may be created after the initial stage of training. For example, the training data of the second stage of training may include examples in which the machine learning components 111 erroneously inferred to indicate opting-out, but in fact indicated an intention to continue receiving communications, and/or in which the machine learning components 111 erroneously inferred to indicate an intention to continue receiving communications, but in fact indicated an intention to opt-out.

The training buffer storage 208 may include hardware, software and/or firmware configured to store information regarding the training, such as, training data, and/or reports generated from the training. The training buffer storage 208 may store sequential training information, data, and/or reports into respective buffer slots in the training buffer storage 208. For example, the training buffer storage 208 may store the sequential training information, data, and/or reports in the respective buffer slots in a temporal order (e.g., according to times of the training).

The feedback engine 210 may include hardware, software and/or firmware configured to provide and/or receive feedback regarding results of the training. For example, the feedback may include adjustments of scores of certain examples or scenarios, and/or changing loads (e.g., overloading or underloading) certain examples or scenarios, as illustrated in FIG. 2B. In some examples, as described with respect to the re-opting engine 118 and the re-opting buffer storage 120, the information regarding the re-opting may be used as feedback to train the machine learning components 111. In particular, an action of re-opting of the client device 162, and/or a short duration of time between opt-out and opting back in of the client device 162, may indicate that a seemingly negative sentiment in a reply was actually a positive sentiment, at least within a context of messages sent to the client device 162 prior to the reply, was indicative of a desire to continue receiving messages. The feedback is intended to improve an initial training by the training engine 206.

The feedback buffer storage 212 may include hardware, software and/or firmware configured to store information regarding the feedback, such as, relevant examples, data, or scenarios in which feedback was obtained, and/or reports generated from the feedback. The feedback buffer storage 212 may store sequential information regarding the feedback into respective buffer slots in the feedback buffer storage 212. For example, the feedback buffer storage 212 may store the sequential information regarding the feedback in a temporal order (e.g., according to times of the feedback).

FIG. 2B illustrates an implementation of the feedback engine 210, which may further encompass a load changing engine 222 and an adjusting engine 224. In particular, the load changing engine 222 may perform, or receive an indication to perform, overloading and/or underloading of certain examples or scenarios. Overloading may include increasing a frequency or a number of occurrences or times at which a particular example or scenario appears in training data, which changes weights of the training data. For example, if a new example, such as a reply of "No mo" appears that did not previously appear, but the new example is considered relevant, for example, an indication of either an opt-out or to continue receiving messages with high (e.g., above a threshold) confidence, then that new example may be overloaded. Overloading may increase a confidence score of that new example. As another example, underloading may include decreasing a frequency or a number of occurrences or times at which a particular example or scenario appears in training data, which changes weights of the training data. Underloading may decrease a confidence level or score of that particular example or scenario.

Meanwhile, the adjusting engine 224 may receive an indication that confidence levels or scores, or outputs (e.g., whether or not the reply indicates to opt-out) corresponding to certain examples, following the training, are erroneous, and receive corrections. The adjusting engine 224 may adjust the confidence levels or scores, or outputs, to correct mistakes or inaccuracies during training, thus improving any results from the training.

Figure 3:
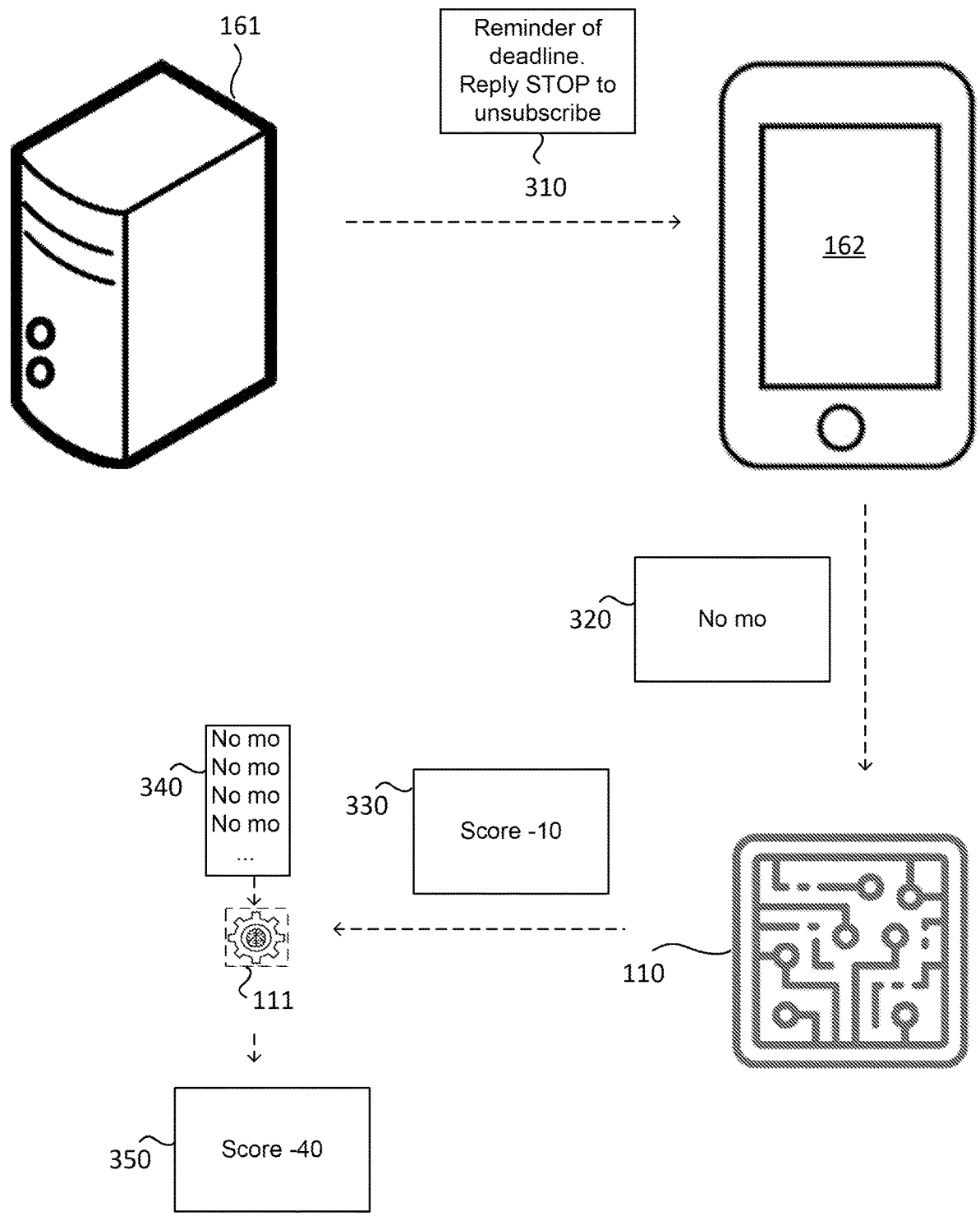
FIG. 3 is a diagram illustrating details of overloading during training of the machine learning components, in accordance with some embodiments of the present invention.

FIG. 3 illustrates an implementation of overloading. In FIG. 3, the message transmitting server 161 may transmit a message 310 to the client device 162. The client device 162 may provide a response 320 by replying "No mo," a reply which the inference engine 110 may not have seen or encountered previously. The inference engine 110 may determine a confidence score, denoted as 330, of negative 10, indicating that the reply is more likely to indicate an intent to opt-out. However, if the confidence level of this score should be higher, then an overloading operation 340 may be performed during the feedback or retraining of the machine learning components 111, which may cause the score to change to an updated score, denoted as 350, of negative 40, for example.

Figure 4A:
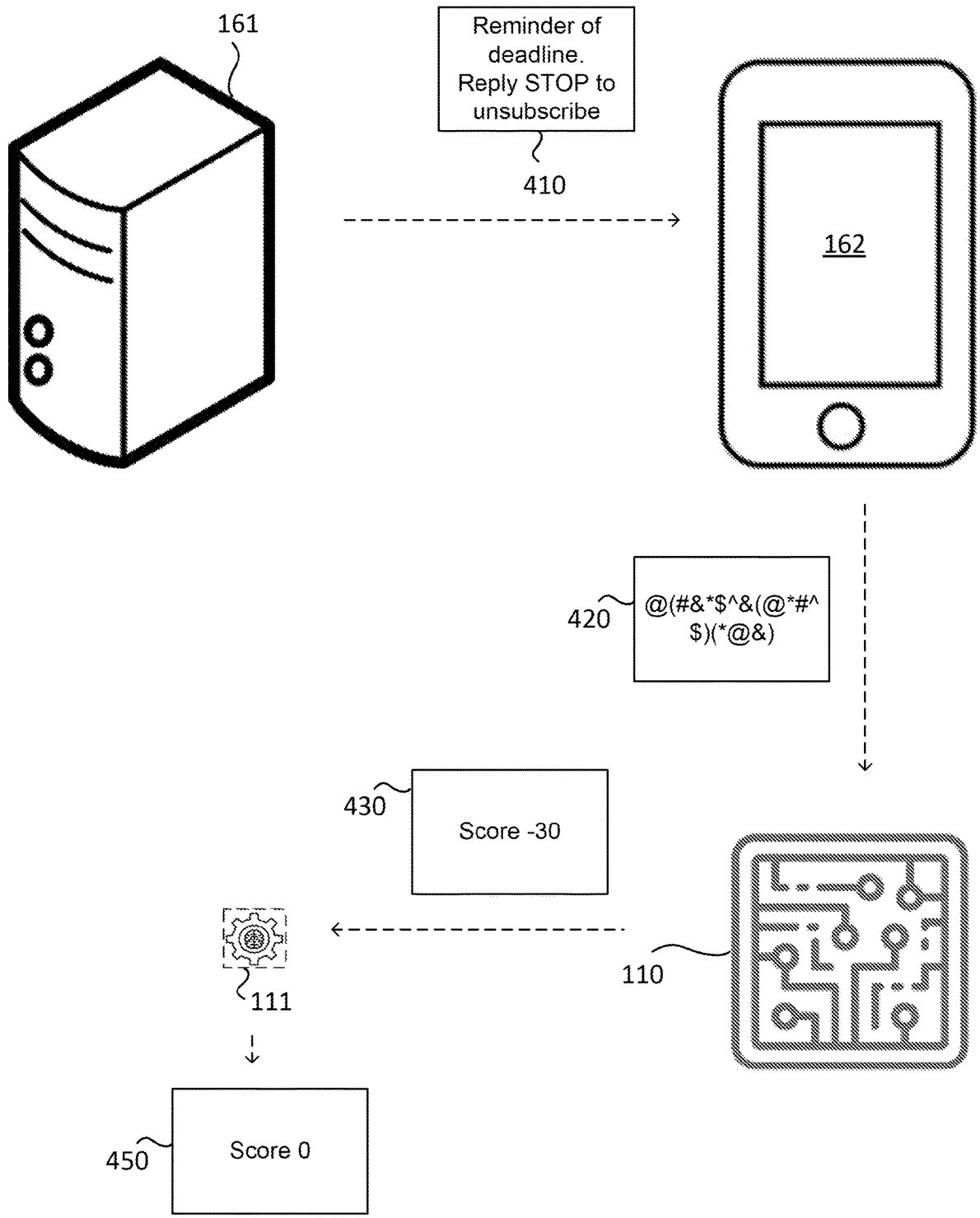
FIGS. 4A and 4B are diagrams illustrating details of adjusting erroneous outputs during training of the machine learning components, in accordance with some embodiments of the present invention.

FIG. 4A illustrates an implementation of receiving feedback regarding an adjustment of a score and performing such adjustment of the score. In FIG. 4A, the message transmitting server 161 may transmit a message 410 to the client device 162. The client device 162 may respond with gibberish or with unintelligible content 420. The inference engine 110 may determine a confidence score, denoted as 430, of negative 30. However, such a reply may be ambivalent regarding whether or not an intent is to opt-out. Thus, the score may be adjusted to an updated score, denoted as 450, of zero.

Figure 4B:
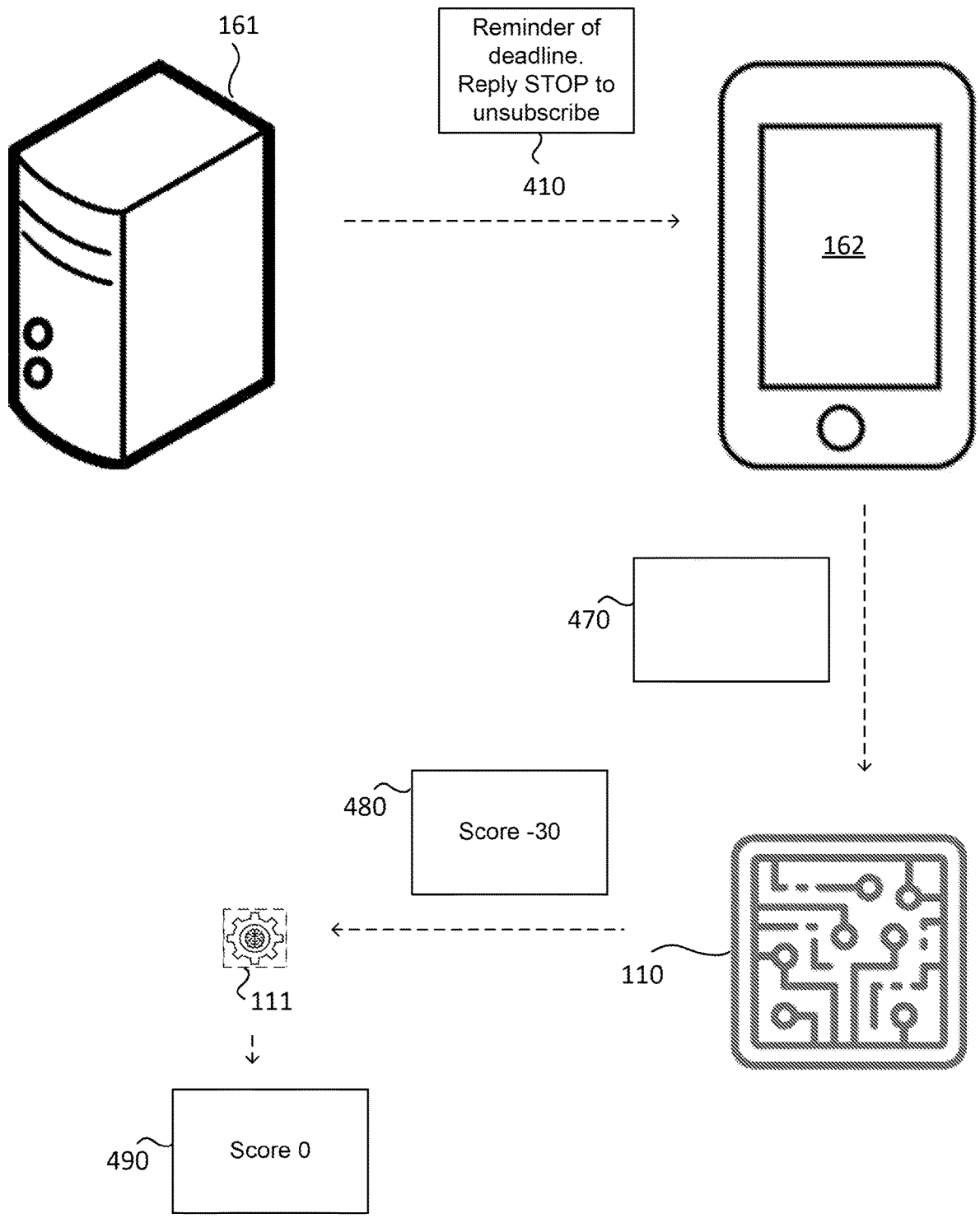

FIG. 4B illustrates an implementation of receiving feedback regarding an adjustment of a score and performing such adjustment of the score. In FIG. 4B, the message transmitting server 161 may transmit the message 410 to the client device 162. The client device 162 may provide a response 470 that includes profanity. The inference engine 110 may determine a confidence score, denoted as 480, of negative 30. However, such a reply may be ambivalent regarding whether or not an intent is to opt-out, because the profanity may have been directed to, or in response to, a content of the message 410 itself rather than a sentiment towards actually receiving the message 410. Thus, the score may be adjusted to an updated score, denoted as 490, of zero. In some examples, if the reply is determined or confirmed to be attributed to the content of the message 410 rather than a sentiment towards actually receiving the message 410, then the score may be adjusted to a positive score, meaning that the client device 162 still desires to receive communications.

Figure 5:
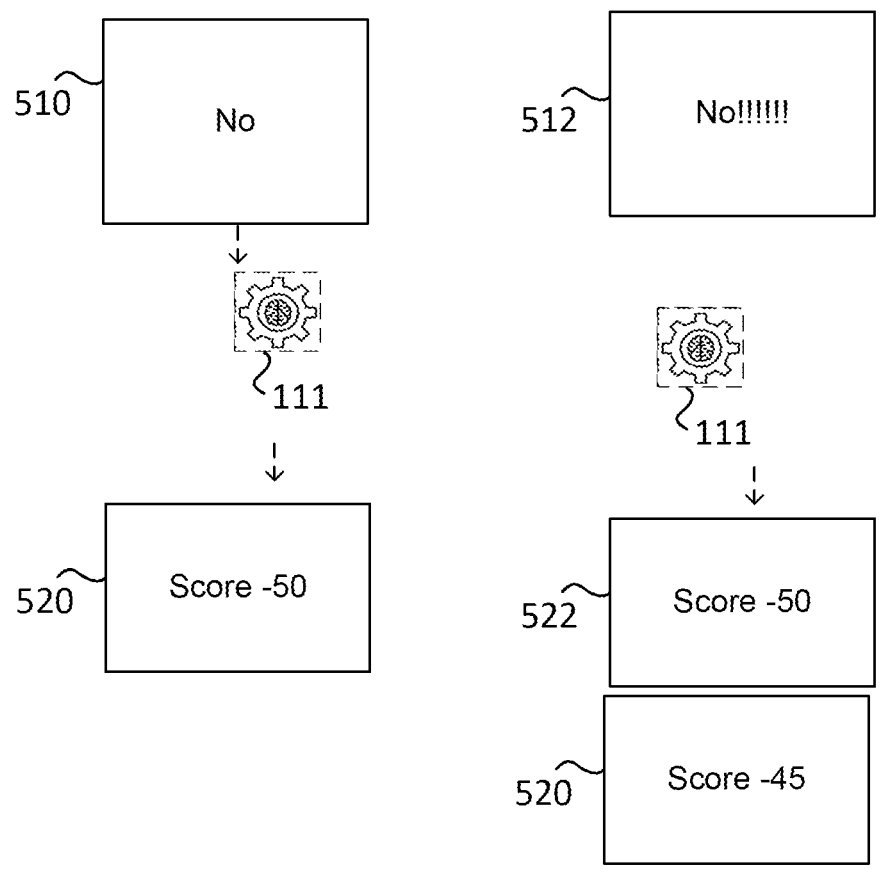
FIG. 5 is a diagram illustrating details of iterative training of the machine learning components, in accordance with some embodiments of the present invention.

FIG. 5 illustrates an example iterative training process in which confidence scores corresponding to previous training data, examples or scenarios may be constantly adjusted following ingestion of new training data. Initially, the machine learning components 111 may determine a first example 510 to have a confidence score, denoted as 520, of negative 50. However, the machine learning components 111 may receive a new example 512, and the machine learning components 111 may determine a confidence score, denoted as 522, of negative 50, while changing a previous score of the example 510 from negative 50 to negative 45, because the new example 512 indicates an intent to opt-out even more strongly than the first example 510.

Figure 6:
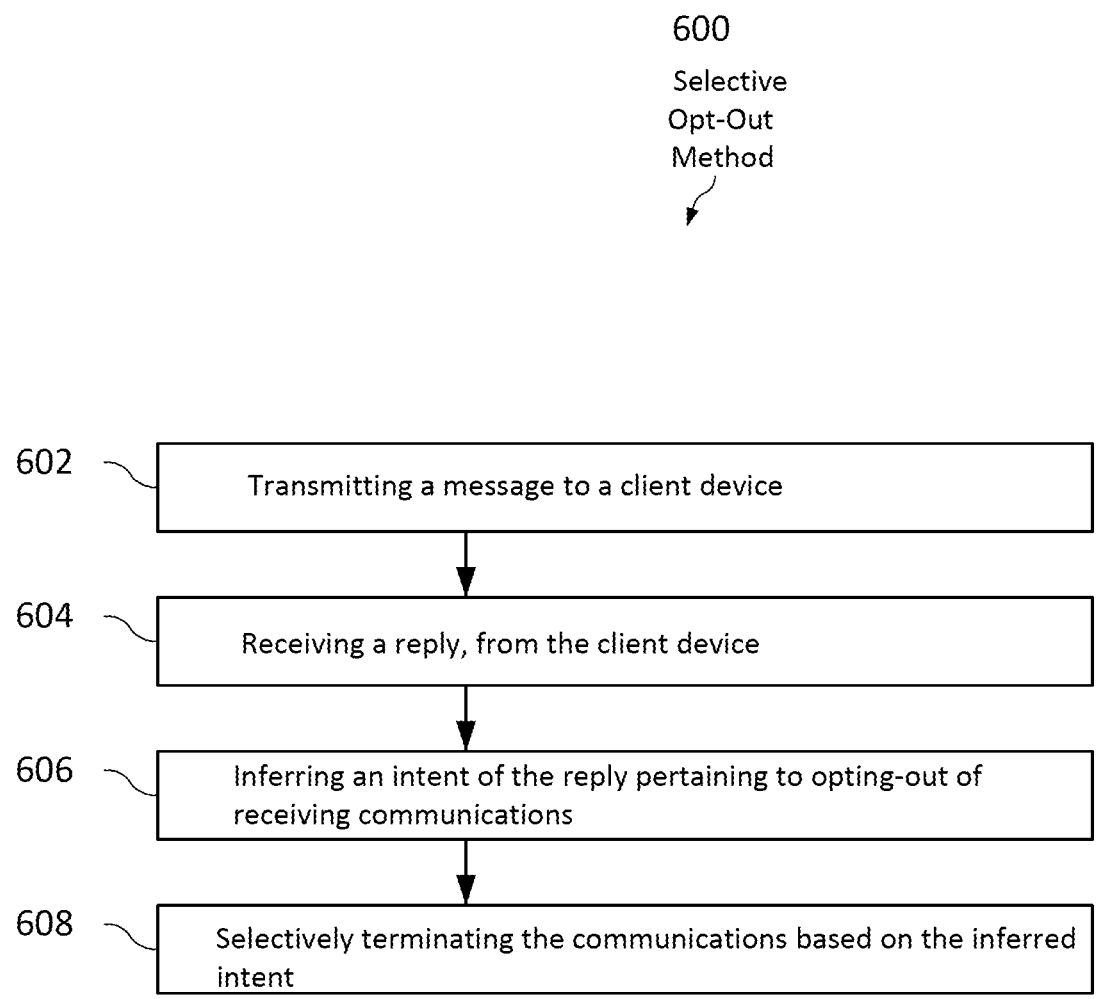
FIG. 6 is a flowchart illustrating details of a method of selectively removing or opting-out a client device from further communications, in accordance with some embodiments of the present invention.

FIG. 6 is a flowchart of a method 600 of selectively opting-out a client device from receiving communications, in accordance with some embodiments of the present invention. Method 600 begins in step 602 with the message transmitting server 161, or the reply obtaining engine 106, as illustrated in FIGS. 1A and 1B, transmitting a message to an entity associated with the client device 162, or the client device 162. This message may provide information such as a deadline, a reminder, a notice, and/or other content, while indicating directions to opt-out of receiving further communications via such messaging.

In step 604, the processing servers 101, in particular, the reply obtaining engine 106, may receive a reply from the client device 162, in response to the transmission of the message. This reply may be further analyzed to infer an intent. In step 606, the processing servers 101, in particular, the inference engine 110, may inferring an intent of the reply pertaining to opting-out of receiving communications. Specifically, the inference engine 110 may infer whether or not the reply indicates an intent to opt-out, or to no longer receive, communications through messaging. The inference engine 110 may further output a confidence score indicative of a level of certainty of the inferred intent.

In step 608, the processing servers 101, in particular, the implementation engine 114, may selectively terminating the communications based on the inferred intent. In particular, may include, in response to inferring that the entity intends to be opted-out of the communications, terminating the communications, and in response to inferring that the entity intends to continue receiving communications, continuing the communications. In some examples, the selective termination of the communications may include adjusting a frequency at which messages are received, as described, for example, with reference to FIG. 1D.

Figure 7:
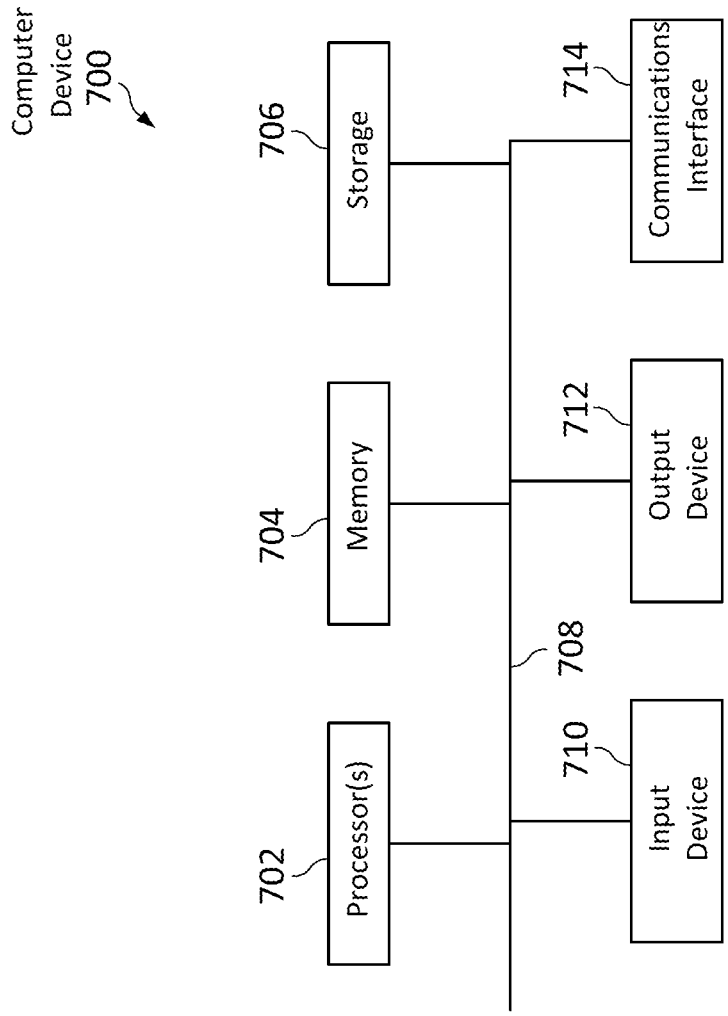
FIG. 7 is a block diagram illustrating details of a computing system.

FIG. 7 is a block diagram of a computing device 700, in accordance with some embodiments. In some embodiments, the computing device 700 may be a particular implementation of the client device 162 and/or of the one or more of the processing servers 101, and may perform some or all of the functionality described herein. The computing device 700 comprises one or more hardware processor 702, memory 704, storage 706, an input device 710, and output device 712 and/or a communications interface 714, all communicatively coupled to a communication channel 708.

The one or more hardware processors 702 may be configured to execute executable instructions (e.g., software programs, applications). In some example embodiments, the one or more hardware processors 702 comprises circuitry or any processor capable of processing the executable instructions.

The memory 704 stores working data. The memory 704 any include devices, such as RAM, ROM, RAM cache, virtual memory, etc. In some embodiments, the data within the memory 704 may be cleared or ultimately transferred to the storage 706 for more persistent retention. The term "memory" herein is intended to cover all data storage media whether permanent or temporary.

The storage 706 includes any persistent storage device. The storage 706 may include flash drives, hard drives, optical drives, cloud storage, magnetic tape and/or extensible storage devices (e.g., SD cards). Each of the memory 704 and the storage 706 may comprise a computer-readable medium, which stores instructions or programs executable by one or more hardware processors 702.

The input device 710 may include any device capable of receiving input information (e.g., a mouse, keyboard, microphone, etc.). The output device 712 includes any device capable of outputting information (e.g., speakers, screen, etc.).

The communications interface 714 may include any device capable of interfacing with external devices and/or data sources. The communications interface 714 may include an Ethernet connection, a serial connection, a parallel connection, and/or an ATA connection. The communications interface 714 may include wireless communication (e.g., 802.11, WiMax, LTE, 5G, WiFi) and/or a cellular connection. The communications interface 714 may support wired and wireless standards.

A computing device 700 may comprise more or less hardware, software and/or firmware components than those depicted (e.g., drivers, operating systems, touch screens, biometric analyzers, battery, APIs, global positioning systems (GPS) devices, various sensors and/or the like). Hardware elements may share functionality and still be within various embodiments described herein. In one example, the one or more hardware processors 702 may include a graphics processor and/or other processors.

An "engine," "system," "datastore," and/or "database" may comprise hardware, software, firmware, and/or circuitry. In one example, one or more software programs comprising instructions capable of being executable by a hardware processor may perform one or more of the functions of the engines, datastores, databases, or systems described herein. Circuitry may perform the same or similar functions. The functionality of the various systems, engines, datastores, and/or databases may be combined or divided differently. Memory or storage may include cloud storage. The term "or" may be construed as inclusive or exclusive. Plural instances described herein may be replaced with singular instances. Memory or storage may include any suitable structure (e.g., an active database, a relational database, a self-referential database, a table, a matrix, an array, a flat file, a documented-oriented storage system, a non-relational No-SQL system, and the like), and may be cloud-based or otherwise.

At least some of the operations of a method may be performed by the one or more hardware processors. The one or more hardware processors may operate partially or totally in a "cloud computing" environment or as a "software as a service" (SaaS). For example, some or all of the operations may be performed by a group of computers being accessible via a network (e.g., the Internet) and via one or more appropriate interfaces (e.g., one or more APIs).

The performance of certain of the operations may be distributed among various hardware processors, whether residing within a single machine or deployed across a number of machines. In some embodiments, the one or more hardware processors or engines may be located in a single geographic location (e.g., within a home environment, an office environment, or a server farm). In some embodiments, the one or more hardware processors or engines may be distributed across a number of geographic locations.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A server system configured to infer opt-out instructions in a reply message from a user, the server system comprising:
   one or more hardware processors; and
   memory storing computer instructions, the computer instructions when executed by the one or more hardware processors configured to perform:
      receiving a reply from the user of a client device, in response to a communication sent to the client device;
      evaluating sentiment and context of the reply to infer intent whether to opt-out of receiving future communications and to generate a confidence score associated with the intent, the evaluating using a computer model;
      selectively instructing to terminate the future communications based on the inferred intent and the confidence score;
      receiving feedback, the feedback including an instruction to opt back in after instructing to terminate the future communications or including an adjustment of the confidence score; and
      training the computer model based on the feedback.

2. The server system of claim 1, wherein the sentiment is based on an existence or an absence of profanity within the reply.

3. The server system of claim 1, wherein the sentiment is based on historical behavior associated with the user of the client device.

4. The server system of claim 3, wherein the historical behavior is based on a frequency of opting back in following the instructing to terminate the future communications.

5. The server system of claim 1, wherein the context is based on the communication sent to the client device.

6. The server system of claim 1, wherein the computer model is generated by a trained machine learning component.

7. The server system of claim 1, wherein the evaluating the sentiment and the context of the reply includes evaluating media components within the reply.

8. The server system of claim 1, wherein the computer instructions, when executed by the one or more hardware processors, are configured to perform adjusting a frequency of the future communications based on an ambivalent confidence score.

9. A processor-based method of inferring opt-out instructions in a reply message from a user, the method comprising:

receiving a reply from the user of a client device, in response to a communication sent to the client device;

evaluating sentiment and context of the reply to infer intent whether to opt-out of receiving future communications and to generate a confidence score associated with the intent, the evaluating using a computer model;

selectively instructing to terminate the future communications based on the inferred intent and the confidence score;

receiving feedback, the feedback including an instruction to opt back in after instructing to terminate the future communications or including an adjustment of the confidence score; and training the computer model based on the feedback.

10. The processor-based method of claim 9, wherein the sentiment is based on an existence or an absence of profanity within the reply.

11. The processor-based method of claim 9, wherein the sentiment is based on historical behavior associated with the user of the client device.

12. The processor-based method of claim 11, wherein the historical behavior is based on a frequency of opting back in following the instructing to terminate the future communications.

13. The processor-based method of claim 9, wherein the context is based on the communication sent to the client device.

14. The processor-based method of claim 9, wherein the computer model is generated by a trained machine learning component.

15. The processor-based method of claim 9, wherein the evaluating the sentiment and the context of the reply includes evaluating media components within the reply.

16. The processor-based method of claim 9, further comprising adjusting a frequency of the future communications based on an ambivalent confidence score.

* * * * *